Aug. 29, 1967  E. E. FREELAND ET AL  3,338,337
HYDRAULIC CYCLE BRAKE

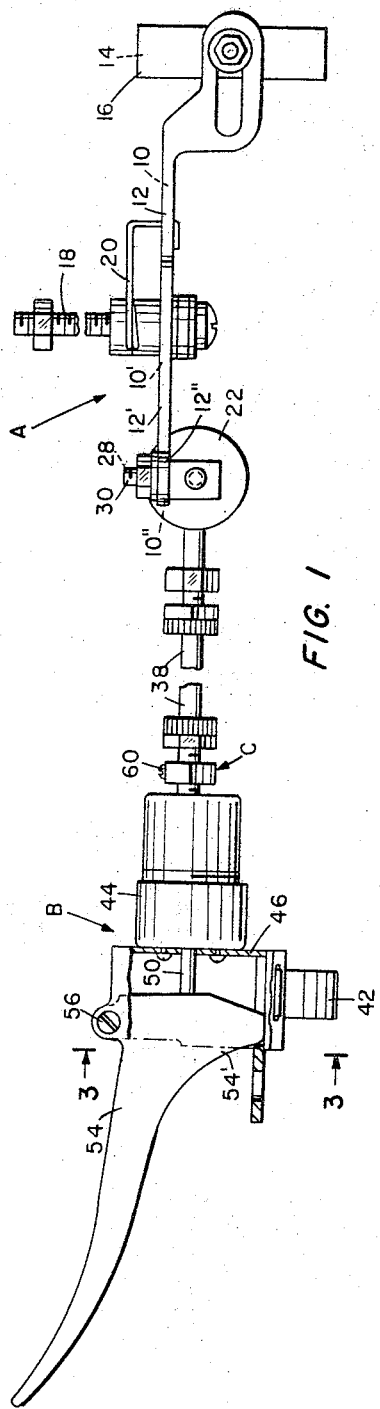

Filed Dec. 15, 1965  2 Sheets-Sheet 2

INVENTORS.
ELMER E. FREELAND
ALBERT L. EVESON

BY
*J. Wesley Everett*
ATTORNEY

United States Patent Office 3,338,337
Patented Aug. 29, 1967

3,338,337
HYDRAULIC CYCLE BRAKE
Elmer E. Freeland, 4500 Belle Grove Road, Baltimore, Md. 21225, and Albert L. Eveson, 219 Sycamore Road, Linthicum, Md. 21090
Filed Dec. 15, 1965, Ser. No. 514,065
1 Claim. (Cl. 188—24)

The present invention relates to a hydraulic bicycle brake and is adaptable to practically all bicycles using rim type caliper brake.

This type of bicycle brake is generally of mechanical construction and is very prone to getting out of adjustment and also subject to rust and dirt clogging its working parts, reducing its efficiency.

The primary object of the invention is to provide a hydraulic brake for bicycles which are not subject to rust, dirt and other hazards causing friction that retards the action of the brake.

Another object of the invention is to provide a simple installation whereby the brake unit may be readily installed to a bicycle in place of the mechanical type brake without altering the structure of the bicycle.

While several objects of the invention have been pointed out, other objects and advantages will become more apparent as the nature of the invention becomes more apparent which consists in its novel construction arrangement and combination of its several parts illustrated in the accompanying drawings and described in the detail description to follow.

In the drawings:

FIGURE 1 is a schematic view in elevation of the brake unit.

FIGURE 2 is a schematic plan view of the brake unit.

FIGURE 3 is a section taken on line 3—3 of FIGURE 1.

FIGURE 4 is a section taken on line 4—4 of FIGURE 2.

FIGURE 5 is a fragmentary view in elevation taken on line 5—5 of FIGURE 2.

In the description like reference characters are used to indicate like parts throughout the several views.

Figure 6:
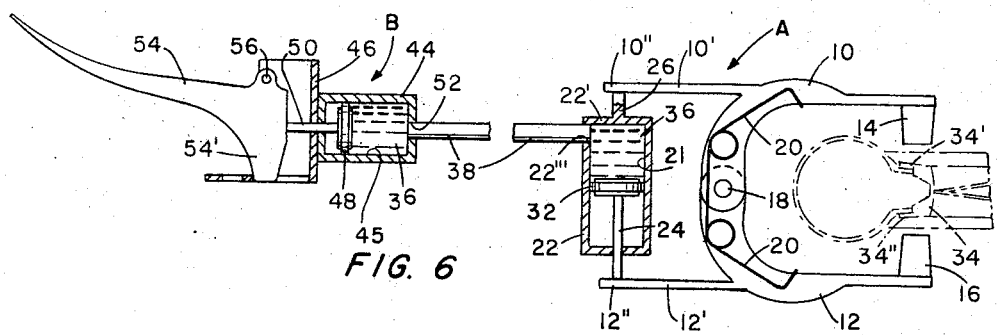
FIGURE 6 is a fragmentary schematic sectional view of the brake, as illustrated in FIGURE 1, showing the brake in released position.
Figure 7:
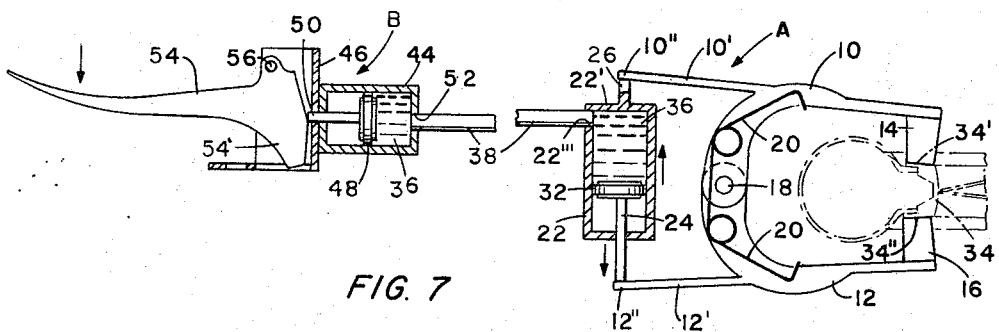
FIGURE 7 is a fragmentary schematic sectional view of the brake similar to that shown in FIGURE 6 showing the brake in operating position.

The brake unit comprises a caliper type brake A having a pair of hinged arm elements 10 and 12 carrying brake shoes 14 and 16. The elements are hinged about a suitable bolt or pin 18 and are resiliently held in an outwardly extended position by a spring member 20. Extending outwardly beyond the hinge 18 and opposite the arm elements 10 and 12 are rigid extension arms 10' and 12'. These arms 10' and 12' are rigidly fixed to the respective arm elements 10 and 12 or are for convenience formed as a part thereof. At the outer ends 10" and 12" of the arms 10' and 12' there is connected a cylinder 22 and a piston rod 24. The cylinder is provided with a fixed extension 26 which in turn is pivotally connected to the end portion 10" by a pin 28. The opposite end 12" of the arm 12' is pivotally connected to the piston rod 24 by the pin 30. The opposite end of the piston rod is fixedly secured to a piston 32 adapted to slidably engage the inner wall of the cylinder 22. The normal position of the piston 32 is toward the enclosed end 22' of the cylinder 22. This is provided by the spring 20, which keep the elements 10 and 12 normally spread apart and out of contact with the wheel.

The brake shoes 14 and 16 are normally held in a position out of contact with the sides 34' and 34" of the wheel rim 34 by the spring 20. The brake shoes are moved in contact with the rim by injecting a fluid 36 into the cylinder 22 between the closed end 22' and the piston 32. The cylinder is provided with an opening 22''' into which is fixed, preferably a flexible tube or pipe 38 through which the fluid is injected. The arms 10 and 12; 10' and 12' and the cylinder 22; piston and piston rod 24 are pivotally supported by the bolt or pin 18 and are movable about the bolt or pin 18 as a unit in order that the brake shoes may adjust themselves to the rim of the wheel. The cylinder and piston are arranged to apply the same force to each of the arms 10 and 12.

Pressure is applied to the fluid 36 by a unit B carried on the handle bar 40 by a clamp 42 or other suitable means adjacent the handle bar grip 58.

The unit B is provided with a cylinder 44 which is secured to a support 46. Operating within the cylinder 44 is a movable piston 48. Connected to the piston is a piston rod 50 which extends out beyond the end of the cylinder connected to the support 46. The opposite end of the cylinder 44 is provided with an opening 52 into which the opposite end of the flexible tube or pipe 38 is connected.

Hingedly connected to the housing 46 is a lever 54 for operating the piston 48. The lever is hinged at a point 56 which is out of the plane of the piston rod and will provide a portion 54' which may be moved relative to the cylinder 44 for operating the piston 48. The lever 54 is positioned adjacent the handle bar grip 58 where it may be conveniently operated by the operator as shown in FIGURE 8.

For conveniently filling the cylinder and the connecting pipe 38 with fluid there is provided a fixture C having an opening closable by a plug 60. The plug may also be used to replenish the supply of fluid in case there is any loss of fluid during the use of the brake.

Figure 8:
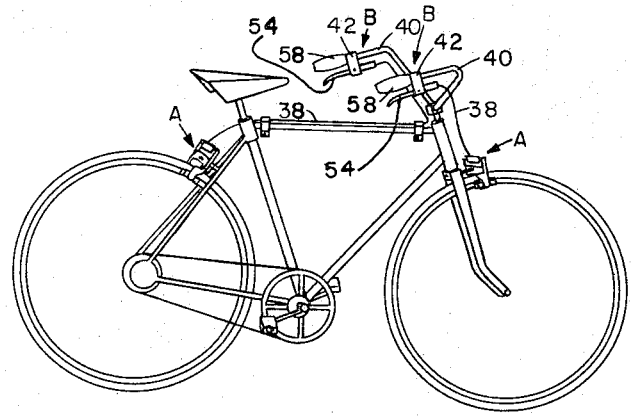

In operation the brake is attached to a bicycle as shown in FIGURE 8, wherein a braking unit is illustrated as being installed for both the front and back wheels, and operated one from each of the two handle bars. Both units are of substantially the same construction. The fluid when the brake is not being applied will be in substantially the position in the cylinders 22 and 44 as shown in FIGURE 6, because of the outward action of the spring 20 on the members 10 and 12. When it is desired to apply the brake, the lever 54 is manually engaged and pressed toward the grip 58, which moves the piston 54 against the piston rod 50 to operate the piston 48, driving the fluid through the flexible pipe 38 into the cylinder 22 which causes the piston 32, within cylinder 22, to move the arm 12 in one direction and the cylinder 22 to move the arm 10 in the opposite direction, moving the brake shoes in contact with the sides 34' and 34" of the wheel rim 34.

When the lever 34 is released, the spring 20 forces the members 10 and 12 apart which in turn moves the piston 32 inwardly within the cylinder 22 forcing the fluid 30 back into the cylinder 44, which in turn moves the lever back to its normal position as shown in FIGURE 6.

It will be noted that in filling the system with fluid, the chamber 21 is reduced by the piston moving inwardly toward the bottom of the cylinder while the chamber 45 will be in expanded position in order that the piston 48 may force sufficient fluid into the chamber 21 to move the arms 10 and 12 carrying the brake shoes into braking position.

While the brake elements are shown to be operated by moving the arm elements 10' and 12' laterally, the brake operation is not limited to this partial linkage as the operating mechanism including the cylinder and piston may be reversed and the operation may be carried out by rearranging the member 10′ to be moved by the piston rod 24 and the arm 12′ operated by the member 26 connected to the cylinder 22. Also the cylinder and piston may, if desired, be replaced by a bellows type expansion and contraction element, or any other type of mechanism or device capable of expansion and contraction by the injection and withdrawing of a fluid into the variable chambers, such as various shapes of closed elastic wall members having means for admitting and releasing the fluid. For example, a ball type of element, or a tube may well be substituted for the cylinder and piston, as is the bellows previously mentioned.

While the invention has been illustrated and described in a particular form it is not intended as a limitation as the invention is best defined in the appended claim.

We claim:

A fluid pressure cycle brake comprising:

a mounting pin adapted to be fixedly secured to the frame of a cycle, a pair of brake arms pivotally mounted on said mounting pin, said brake arms having portions extending outwardly in substantially opposite directions from said pin and curving in opposite directions to substantially parallel juxtaposition with respect to each other at one side of said mounting pin, brake shoes adjustably fastened to the ends of said juxtapositioned portions of said brake arms and facing each other, said brake arms further having extensions projecting therefrom in substantially parallel opposed relationship on the other side of said mounting pin from said curved portions, a cylinder having a closed end and an open end and a fluid conduit communicating with the interior of said cylinder adjacent the closed end, a cap closing the open end of said cylinder having an opening therethrough, a piston slidable in said cylinder having a piston rod extending outwardly therefrom through said opening in said cap, the closed end of said cylinder being pivotally connected to one of said extensions and the outwardly extending end of said piston rod being pivotally connected to the other of said extensions, said last mentioned pivotal connections forming the sole supporting means for said cylinder and piston and forming a free floating support therefor, a spring member having a central straight section positioned adjacent said mounting pin, a pair of spring coils at the ends of the straight section, one positioned on each side of said central pin, a pair of lateral straight sections extending from said spring coils and a pair of hooks at the free ends of said lateral straight sections resiliently engaging over the inner edges of said brake arms and normally biasing them outwardly, means for applying fluid pressure to said cylinder and piston through said fluid conduit, said latter means comprising, a second cylinder to which said fluid conduit is connected, a housing attached to said second cylinder having parallel side walls and an end wall, a hand lever pivoted between the side walls, a piston in said second cylinder having a piston rod projecting therefrom and through the end wall of the housing, the hand lever having a portion abutting the end of the piston rod whereby pivoting the hand lever will actuate the piston in the second cylinder and apply pressure to the fluid in the system and actuate the brake arms.

References Cited

FOREIGN PATENTS

| | | |
|---|---|---|
| 202,368 | 10/1955 | Australia. |
| 537,716 | 5/1955 | Belgium. |
| 497,505 | 9/1919 | France. |
| 684,505 | 12/1952 | Great Britain. |
| 315,594 | 3/1934 | Italy. |

MILTON BUCHLER, *Primary Examiner.*

BENJAMIN HERSH, *Examiner.*

B. S. MOWRY, *Assistant Examiner.*